US011644152B2

(12) United States Patent
Hwang et al.

(10) Patent No.: US 11,644,152 B2
(45) Date of Patent: May 9, 2023

(54) APPARATUS FOR INJECTING GAS

(71) Applicant: REPUBLIC OF KOREA (NATIONAL INSTITUTE OF METEOROLOGICAL SCIENCES), Seogwipo-si (KR)

(72) Inventors: Sung Eun Hwang, Seogwipo-si (KR); Byeong Taek Kim, Seogwipo-si (KR); Young Tae Lee, Seogwipo-si (KR); Ki Hoon Kim, Seogwipo-si (KR)

(73) Assignee: REPUBLIC OF KOREA (National Institute of Meteorological Sciences), Seogwipo-si (KR)

( * ) Notice: Subject to any disclaimer, the term of this patent is extended or adjusted under 35 U.S.C. 154(b) by 0 days.

(21) Appl. No.: 17/900,800

(22) Filed: Aug. 31, 2022

(65) Prior Publication Data
US 2023/0064365 A1 Mar. 2, 2023

(30) Foreign Application Priority Data

Sep. 1, 2021 (KR) ........................ 10-2021-0116438

(51) Int. Cl.
*F17C 7/00* (2006.01)
*G01W 1/08* (2006.01)

(52) U.S. Cl.
CPC ........ *F17C 7/00* (2013.01); *F17C 2201/0119* (2013.01); *F17C 2205/0323* (2013.01); *F17C 2250/0443* (2013.01); *F17C 2250/0694* (2013.01); *F17C 2270/05* (2013.01); *G01W 1/08* (2013.01)

(58) Field of Classification Search
CPC ...... F17C 2201/0119; F17C 2205/0323; F17C 2250/0443; F17C 2250/0694
See application file for complete search history.

(56) References Cited

U.S. PATENT DOCUMENTS

| 3,692,071 A * | 9/1972 | Begleiter ................. F17C 7/00 |
| | | 137/853 |
| 5,895,010 A * | 4/1999 | Aurilio .................... G01W 1/08 |
| | | 244/31 |
| 2015/0309157 A1 | 10/2015 | Knoblach et al. |
| 2020/0247520 A1* | 8/2020 | Lee ........................ H02N 11/00 |

FOREIGN PATENT DOCUMENTS

| JP | 2004-034755 A | 2/2004 |
| JP | 2013-181821 A | 9/2013 |
| KR | 20-1990-0006103 Y1 | 7/1990 |
| KR | 20-0444562 Y1 | 5/2009 |
| KR | 10-2010-0133106 A | 12/2010 |
| KR | 10-2011-0050090 A | 5/2011 |
| KR | 10-2011-0052835 A | 5/2011 |
| KR | 10-2019-0061584 A | 6/2019 |
| KR | 20-2021-0000082 U | 1/2021 |

* cited by examiner

*Primary Examiner* — Jason K Niesz
(74) *Attorney, Agent, or Firm* — Invenstone Patent, LLC

(57) ABSTRACT

Disclosed is a gas injection apparatus which measures and displays a gas amount supplied to a radiosonde instrument. The gas injection apparatus includes: a body which includes an inlet port through which the gas is introduced from the storage tank, a flow passage through which the gas introduced from the inlet port flows, and an outlet port through which the gas passing through the flow passage is discharged; a valve which opens/closes the flow passage, and a flow meter which is installed in the body and is configured to measure and display the flow rate of the gas supplied to the instrument.

12 Claims, 9 Drawing Sheets

10(11,12,13)
20(21,22)
100(110,120,130)

APPARATUS FOR INJECTING GAS

CROSS-REFERENCE TO RELATED APPLICATIONS

This application claims the priority of Korean Patent Application No. 10-2021-0116438 filed on Sep. 1, 2021, in the Korean Intellectual Property Office, the disclosure of which is incorporated herein by reference.

BACKGROUND

Technical Field

The present disclosure relates to an apparatus for injecting gas, and more particularly, to a gas injection apparatus which measures and displays an amount of injected gas.

Description of the Related Art

Generally, a gas injection apparatus for injecting gas into an instrument (radiosonde instrument) used for weather observation is connected to a gas storage tank which stores gas (for example, H or He) to supply the gas stored in the gas storage tank to the radiosonde instrument.

In the related art, after attaching a gas pressure regulator to the gas storage tank, in a state in which the gas pressure regulator is connected to an end of the gas injection apparatus and the radiosonde instrument is connected to the other end of the gas injection apparatus, a value of the storage tank is adjusted or a lever of the gas injection apparatus is pulled to inject gas into the radiosonde instrument.

However, during the process of injecting the gas into the radiosonde instrument, it was difficult for an operator to identify an amount of gas supplied to the radiosonde instrument so that there was a problem in that a predetermined amount of gas was not precisely injected into the radiosonde instrument. Therefore, there were a problem in that an amount of injected gas was different from the predetermined amount of gas so that a flying speed and a flying time of the radiosonde were different.

Further, during the process of injecting the gas, the gas injection apparatus was separated from the radiosonde instrument due to the pressure of the gas so that there was a problem of gas leakage.

RELATED ART DOCUMENT

Utility Model Document (Utility Model Document 1) Korean Utility Model No. 20-0444562 Y1

SUMMARY

An object to be achieved by the present disclosure is to provide a gas injection apparatus which measures and displays an amount of gas supplied to a radiosonde instrument.

Further, another object of the present disclosure is to provide a gas injection apparatus which is capable of fixing the radiosonde instrument thereto while injecting the gas.

In order to achieve the above-described objects, according to an aspect of the present disclosure, a gas injection apparatus is a gas injection apparatus which injects gas stored in a storage tank into a radiosonde instrument including: a body which includes an inlet port through which the gas is introduced from the storage tank, a flow passage through which the gas introduced from the inlet port flows, and an outlet port through which the gas passing through the flow passage is discharged; a valve which opens/closes the flow passage; and a flow meter which is installed in the body and is configured to measure and display the flow rate of the gas supplied to the instrument.

The storage tank includes a tank flow sensor for measuring a gas amount stored therein, the flow meter includes: a reception module which receives a gas amount (first measurement value) measured by the tank flow sensor; and a measurement module which is connected to the reception module and measures a gas amount (second measurement value) flowing along the flow passage based on the gas amount (first measurement value) received by the reception module.

The flow meter includes a display module which displays at least one of a gas amount (first measurement value) transmitted to the reception module and a gas amount (second measurement value) measured by the measurement module.

The display module further includes: an input member to further display a predetermined gas amount to be supplied to the instrument.

The flow meter further includes a calculation module which is connected to the display module and the measurement module and calculates a remaining gas amount (third measurement value) to be supplied to the instrument, based on the gas amount (second measurement value) measured by the measurement module and the predetermined gas amount, and the display module displays the remaining gas amount (third measurement value) to be supplied to the instrument.

The flow meter includes a control module which compares a gas amount (second measurement value) measured by the measurement module and the predetermined gas amount to be supplied to the instrument to control the valve to be open/closed.

When a gas amount (second measurement value) calculated by the measurement module exceeds 90% of the predetermined gas amount, the control module reduces an opening degree of the valve in proportion to an exceeded gas amount.

The valve further includes: a lever which is pressurized by an operation of an operator and rotatably installed in the body to open/close the flow passage, and the flow meter further includes an alarm module which compares the second measurement value measured by the measurement module and the predetermined gas amount to be supplied to the instrument and operates when the second measurement value measured by the measurement module exceeds 90% of the predetermined gas amount.

The body includes: a frame; a gas pipe which partially protrudes to the outside from the frame, has the inlet port at one end, has the outlet port at the other end, and forms the flow passage; and a fixing member which is disposed to enclose the portion of the gas pipe which outwardly protrudes from the frame, is selectively coupled to the instrument, and is coupled to the frame.

The fixing member includes: a fixing nipple which is fixed to the frame at one end, is coupled to an inlet pipe of the instrument at the other end, and has an inner diameter increasing from one end to the other end; and a fixing nut which is movably coupled to an outer circumferential surface of the fixing nipple so as to pressurize the other end of the fixing nipple.

The fixing nipple includes: a first fixing unit which forms one end of the fixing nipple; a second fixing unit which forms the other end of the fixing nipple and extends from the first fixing unit; and a third fixing unit which forms the other end of the fixing nipple and extends from the first fixing unit so as to be opposite to the second fixing unit, an inner diameter of the fixing nut is equal to or larger than a diameter of the first fixing unit and is equal to or smaller than a diameter formed by the second fixing unit and the third fixing unit.

The body includes an adjusting member which is inserted into the gas pipe and is rotatably coupled to the frame so as to adjust a flow rate of the gas in the flow passage.

In order to achieve the above-described objects, according to another aspect of the present disclosure, a gas injection apparatus is a gas injection apparatus which injects gas of a storage tank into a radiosonde instrument, including: a body which is connected to the storage tank and the instrument and has a flow passage through which gas is movable; a valve which opens/closes the flow passage; and a flow meter which is installed in the body and is configured to measure and display the flow rate of the gas supplied to the instrument. the valve includes a lever which is pressurized by an operator and is rotatably installed in the body, the flow meter includes a control module which is connected to the valve and operates according to the measured and displayed gas flow rate, and the valve is configured to be operated by the lever to open or close the flow passage or operated by a control signal of the control module to open or close the flow passage.

According to the present disclosure, when the gas is injected into the radiosonde instrument, an amount of injected gas may be identified in real-time. Therefore, the user may more precisely control an amount of gas injected into the radiosonde instrument.

Further, the supply of the gas may be automatically controlled according to an amount of gas injected into the radiosonde instrument.

Further, when the gas is injected, separation of the radiosonde instrument from the gas injection apparatus due to the pressure of the injected gas may be suppressed or prevented.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
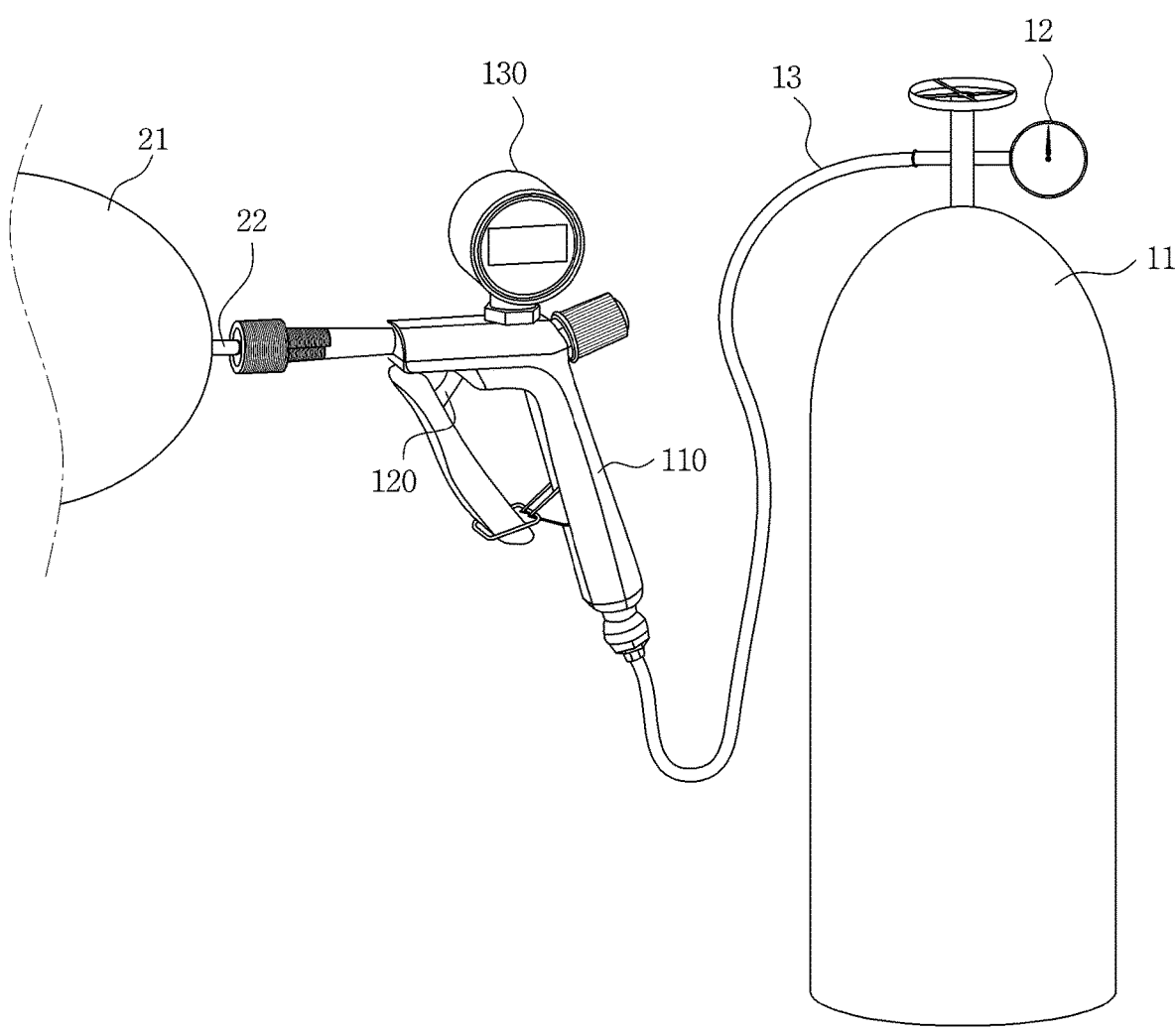
FIG. 1 is a view illustrating a state that a gas injection apparatus according to an exemplary embodiment of the present disclosure is connected to a radiosonde instrument and a storage tank.

The exemplary embodiment disclosed in the present specification may be modified in various forms. A specific embodiment is illustrated in the drawings and is described in detail in the detailed description. However, the specific embodiment disclosed in the accompanying drawing is merely provided for easy understanding of various embodiments. Accordingly, it should be understood that the technical spirit is not limited by the specific embodiment disclosed in the accompanying drawing, but includes all equivalents or alternatives included in the spirit of and the technical scope the present disclosure.

Terms including an ordinary number, such as first and second, are used for describing various constituent elements, but the constituent elements are not limited by the terms. The above terms are used only to discriminate one component from the other component.

In the present specification, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance. It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

In the meantime, "module" or "unit" for components used in the present specification performs at least one function or operation. Further, "module" or "unit" may perform a function or an operation by software or a combination of hardware and software. Further, a plurality of "modules" or a plurality of "units" excluding "module" or "unit" which has to be executed in a specific hardware or is executed in at least one processor may be integrated as at least one module. A singular form may include a plural form if there is not clearly opposite meaning in the context.

In addition, in the description of the exemplary embodiment, a detailed description of known configurations or functions incorporated herein will be contracted or omitted when it is determined that the detailed description may make the subject matter of the present disclosure unclear.

Hereinafter, various embodiments will be described in more detail with reference to accompanying drawings.

A gas injection apparatus may be an apparatus which injects gas of a storage tank into a radiosonde instrument. Gas which is injected into the radiosonde instrument by the gas injection apparatus may be inert gas having a density lower than the air, for example, H or He.

FIG. 1 is a view illustrating a state that a gas injection apparatus according to an exemplary embodiment of the present disclosure is connected to a radiosonde instrument and a storage tank.

A structure of the gas storage tank 10 which supplies the gas to the gas injection apparatus 100 and a structure of the radiosonde instrument 20 to which the gas is supplied from the gas injection apparatus 100 will be described with respect to FIG. 1.

The gas storage tank 10 stores gas. The gas storage tank 10 includes a tank housing 11, a supply hose 13, and a tank flow sensor 12.

The tank housing 11 may be provided with a container shape extending vertically. The tank housing 11 may have an inner space in which a gas is stored therein.

The supply hose 13 serves as a passage through which gas in the tank housing 11 moves to the gas injection apparatus 100. The supply hose 13 is installed in the tank housing 11 and one end thereof communicates with the inner space of the tank housing 11. Further, the other end of the supply hose 13 is connected to a gas pipe 112 of the gas injection apparatus 100 to be described below. For example, the supply hose 13 may be provided with a robber material to be freely bendable and stretchable.

The tank flow sensor 12 is installed in the tank housing 11 and measures an amount of gas stored in the inner space of the tank housing 11. The tank flow sensor 12 may sense a movement amount of gas which moves per unit time to the gas injection apparatus 100 from the inner space of the tank housing 11 by means of the supply hose 13. For example, the tank flow sensor 12 may be installed in the supply hose 13 or installed between the tank housing 11 and the supply hose 13. Hereinafter, an example that the tank flow sensor 12 is installed between the tank housing 11 and the supply hose 13 will be described. The tank flow sensor 12 is electromagnetically connected to a reception module 131 of the gas injection apparatus 100 to be described below and transmits a measured gas amount (that is, a first measurement value) to the reception module 131.

The radiosonde instrument 20 floats a radiosonde which observes weather conditions (for example, an atmospheric pressure, a temperature, a humidity, a wind direction, and a wind speed) at an altitude above stratosphere. The radiosonde instrument 20 is provided as a free-flying device (for example, balloon) and is connected to the radiosonde to fly the radiosonde. The radiosonde instrument 20 may include a balloon 21, an inlet pipe 22, and a parachute connecting line (not illustrated).

The balloon 21 may have gas introduced therein and may be provided with a material which expands in volume when gas is introduced. For example, the balloon 21 may be provided with an elastic material (for example, a Latex material) which may be stretched or contracted.

The inlet pipe 22 introduces the gas into the balloon 21. The inlet pipe 22 is connected to an outlet port 112 of the gas injection apparatus 100 to be described below and is fixed to the gas pipe 112 by a fixing member 113 of the gas injection apparatus 100.

A parachute connection line may be installed in the balloon 21. The parachute connection line may connect the balloon 21 and a parachute (not illustrated).

The structures and the shapes of components of the storage tank 10 and the radiosonde instrument 20 which have been described above are not limited thereto, but may vary.

Figure 2:
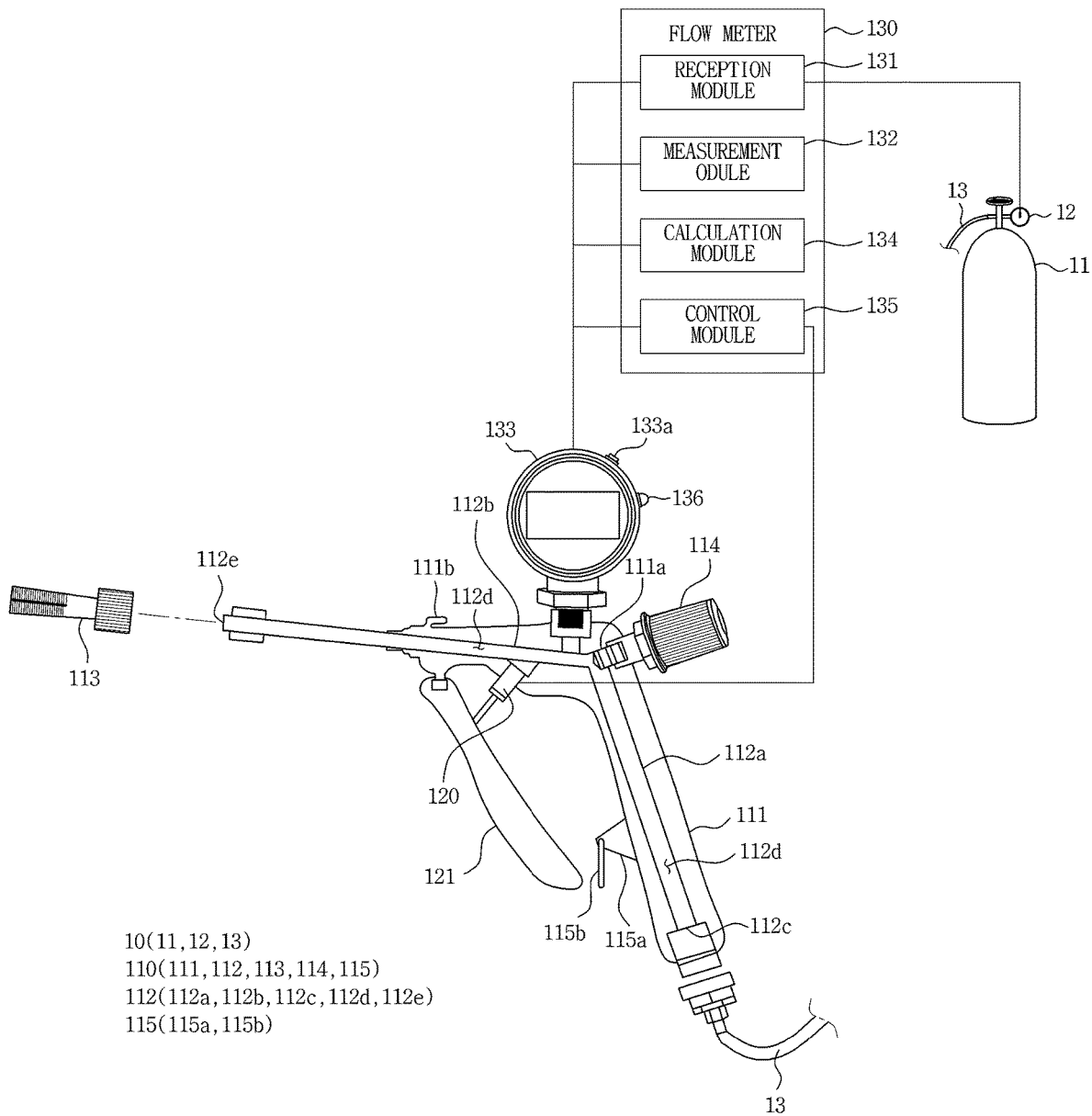
FIG. 2 is a view illustrating a structure of a gas injection apparatus according to an exemplary embodiment of the present disclosure.

FIG. 2 is a view illustrating a structure of a gas injection apparatus according to an exemplary embodiment of the present disclosure. Hereinafter, the gas injection apparatus 100 according to the exemplary embodiment of the present disclosure will be described with reference to FIGS. 1 and 2. The gas injection apparatus 100 according to the exemplary embodiment of the present disclosure is a gas injection apparatus 100 which injects gas stored in the storage tank 10 into the radiosonde instrument 20 and includes a body 110 having an inlet port 112c which is supplied with gas from the storage tank 10, a flow passage 112d through which the gas introduced through the inlet port 112c flows, and an outlet port 112e through which the gas passing through the flow passage 112d is discharged, a valve 120 which opens/closes the flow passage 112d, and a flow meter 130 which is installed on the body 110 and is configured to measure and display a flow rate of the gas supplied to the radiosonde instrument 20.

The body 110 of the gas injection apparatus may include a frame 111, a gas pipe 112 which forms a flow passage with the inlet port 112c and the outlet port 112e, a fixing member 113 which fixes the gas pipe 112 and an inlet pipe 22 to each other, and an adjusting member 114.

The frame 111 has a space for disposing the gas pipe 112 therein and formed to be partially downwardly bent. For example, the frame 111 may be substantially formed to have an inverted "L" shape.

Further, the frame 111 may include a groove 111a which is inwardly recessed in a position adjacent to the gas pipe 112. The adjusting member 114 to be described below may be inserted into the groove 111a.

Further, the frame 111 may have a fixing protrusion 111b around which the parachute connection line is wound. The fixing protrusion 111b is installed in an upper portion of the frame 111 and provided to be bent. For example, the fixing protrusion 111b may be substantially formed to have an inverted "L" shape. The fixing protrusion 111b may suppress or prevent the parachute connection line to be sucked into the inlet pipe 22 when the gas is injected.

The gas pipe 112 serves as a passage through which gas moves. The gas pipe 112 is installed in the frame 111 and forms the inlet port 112c, the flow passage 112d, and the outlet port 112e. The gas pipe 112 may have a pipe shape in which a part is downwardly bent. One open end portion of the gas pipe 112 may be the inlet port 112c and the other open end portion may be the outlet port 112e, and the penetrated inside may be a flow passage 112d which serves as a passage through which the gas moves.

Hereinafter, when the structure of the gas pipe 112 is described, as illustrated in FIG. 2, a part of the gas pipe 112 which is downwardly bent is referred to as a first part 112b and a part which horizontally extends from the upper portion of the downwardly bent part is referred to a second part 112b. A lower portion of the first part 112a may be the above-described one end portion and the inlet port 112c may be provided at one end portion. Further, a left end portion of the second part 112b may be the above-described other end portion and the outlet port 112e may be provided at the other end portion. As described above, the inlet port 112c of the gas pipe 112 is coupled to the supply hose 13 and the outlet port 112e of the gas pipe 112 is connected to the inlet pipe 22 of the radiosonde instrument 20.

Further, at least a part of the second part 112b of the gas pipe 112 protrudes outwardly from the frame 111 so that the outlet port 112e is disposed at the outside of the frame 111. The fixing member 113 to be described below may be inserted into a portion of the gas pipe 112 which protrudes outwardly from the frame 111.

At least a portion of the gas pipe 112 may be flexibly formed. For example, the gas pipe 112 may be formed as a corrugate tube. Therefore, when impact or vibration is transmitted to the gas pipe 112, the gas pipe 112 is bent to absorb the impact or vibration.

The gas pipe 112 may be provided such that an inner diameter is gradually reduced along a direction that the gas moves (that is a direction from the inlet port 112c to the outlet port 112e). For example, the gas pipe 112 may be provided to have a shape in which the inner diameter is reduced along the gas movement direction. For example, at the same flow rate, the smaller the cross-section of the flow passage, the higher the movement speed of the fluid. The gas pipe 112 is formed such that the size of the inner diameter is gradually reduced along the direction that the gas moves, so that the movement speed of the gas which moves the flow passage 112d is increased and the gas may be more smoothly injected from the storage tank 10 to the radiosonde instrument 20.

The gas pipe 112 is formed such that an inner diameter of at least one of the first part 112a and the second part 112b is gradually reduced. For example, the inner diameters of both the first part 112a and the second part 112b are reduced along the gas movement direction or the inner diameter of only one of them is reduced.

Figure 3A:
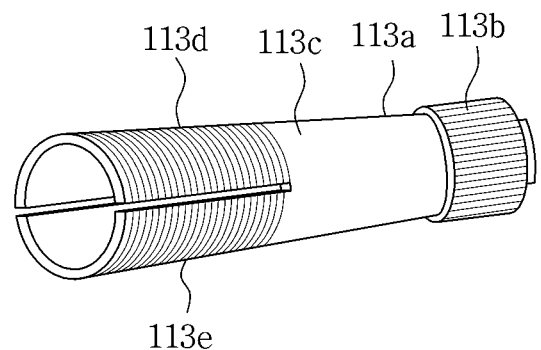
FIGS. 3A, 3B, 3C are views illustrating a structure of a fixing member according to an exemplary embodiment of the present disclosure.
Figure 3B:
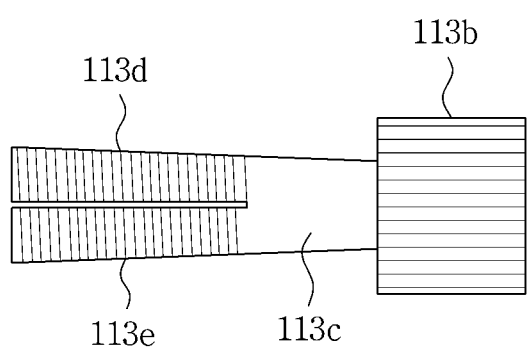
Figure 3C:
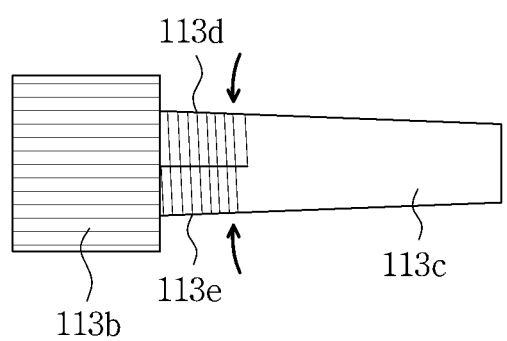

FIGS. 3A, 3B, 3C are views illustrating a structure of a fixing member according to an exemplary embodiment of the present disclosure. Hereinafter, the structure of the fixing member 113 will be described in detail with reference to FIGS. 1 to 3C.

The fixing member 113 fixes the gas injection apparatus 100 to the radiosonde instrument 20. The fixing member 113 is inserted into the second part 112b to enclose a portion of the second part 112b of the gas pipe 112 which protrudes outwardly from the frame 111.

One end of the fixing member 113 is coupled to the protruding portion of the second part 112b and the other end is selectively coupled to the inlet pipe 22. That is, the fixing member 113 is fixed to the inlet pipe 22 while being coupled to the frame 111 and prevents the gas pipe 112 from being separated from the inlet pipe 22 by a pressure generated when the gas is supplied. The fixing member 113 is coupled to the frame 111, and includes a fixing nipple 113a into which the inlet pipe 22 is inserted, and a fixing nut 113b which pressurizes the inlet pipe 22 inserted into the fixing nipple 113a.

The fixing nipple 113a may be formed such that a diameter is gradually increased along the movement direction of the gas. That is, the fixing nipple 113a may be formed such that a diameter of the other one end through which the inlet pipe 22 is inserted is larger than a diameter of one end coupled to the frame 111. The fixing nipple 113a includes a first fixing unit 113c, a second fixing unit 113d, and a third fixing unit 113e.

The first fixing unit 113c may be a portion which forms one end of the fixing nipple 113a. The first fixing unit 113c may be provided as a cylindrical pipe whose diameter is gradually increased along the gas movement direction. The largest diameter of the first fixing unit 113c may be formed to be equal to or smaller than a length of the inner diameter of the fixing nut 113b.

The second fixing unit 113d may be a portion which extends from the first fixing unit 113c along the gas movement direction and forms the other end of the fixing nipple 113a. The second fixing unit 113d may be provided as a hemispherical tube having a hollow cross-section. For example, the second fixing unit 113d may be formed to have a saddle shape. The second fixing unit 113d may be formed such that a diameter is gradually increased along the gas movement direction. That is, a diameter of one end of the second fixing unit 113d is equal to a diameter of the first fixing unit 113c and a diameter of the other end of the second fixing unit 113d is larger than a diameter of the first fixing unit 113c. Further, a screw thread may be provided on an outer circumferential surface of the second fixing unit 113d.

The third fixing unit 113e may be formed to extend from the first fixing unit 113c along the gas movement and be opposite to the second fixing unit 113d. The third fixing unit 113e is formed to have the same shape as the second fixing unit 113d and is provided to be symmetrical to the second fixing unit 113d while being spaced apart from the second fixing unit 113d. That is, a slit shaped gap is formed between the third fixing unit 113e and the second fixing unit 113d and a diameter of the third fixing unit is increased along the gas movement direction together with the second fixing unit 113d. A diameter formed by the third fixing unit 113e and the second fixing unit 113d may be larger than an inner diameter of the fixing nut 113d.

The fixing nut 113b may be provided with a ring shape extending along a circumference of the fixing nipple 113a. A screw thread may be formed on the inner circumferential surface of the fixing nut 113b. The screw thread of the fixing nut 113b may be screwed with the screw threads formed on the outer circumferential surfaces of the second fixing unit 113d and the third fixing unit 113e.

Further, the fixing nut 113b has an inner diameter which is larger than a diameter of the first fixing unit 113c and is smaller than a diameter formed by the second fixing unit 113d and the third fixing unit 113e. Therefore, the fixing nut 113b may move along the gas movement direction to pressurize the second fixing unit 113d and the third fixing unit 113e to be closed to each other. That is, the fixing nut 113b may move along the gas movement direction and pressurize the second fixing unit 113d and the third fixing unit 113e to reduce the gap between the second fixing unit 113d and the third fixing unit 113e. Accordingly, the fixing nut 113b may fix the inlet pipe inserted between the second fixing unit 113d and the third fixing unit 113e to the second fixing unit 113d and the third fixing unit 113e. Accordingly, the other end (that is, the second fixing unit 113d and the third fixing unit 113e) of the fixing nipple 113a is fixed to the inlet pipe 22 and suppresses or prevents the gas injection apparatus 100 from being separated from the radiosonde instrument 20 due to the pressure of the gas which is injected into the radiosonde instrument 20.

Figure 4A:
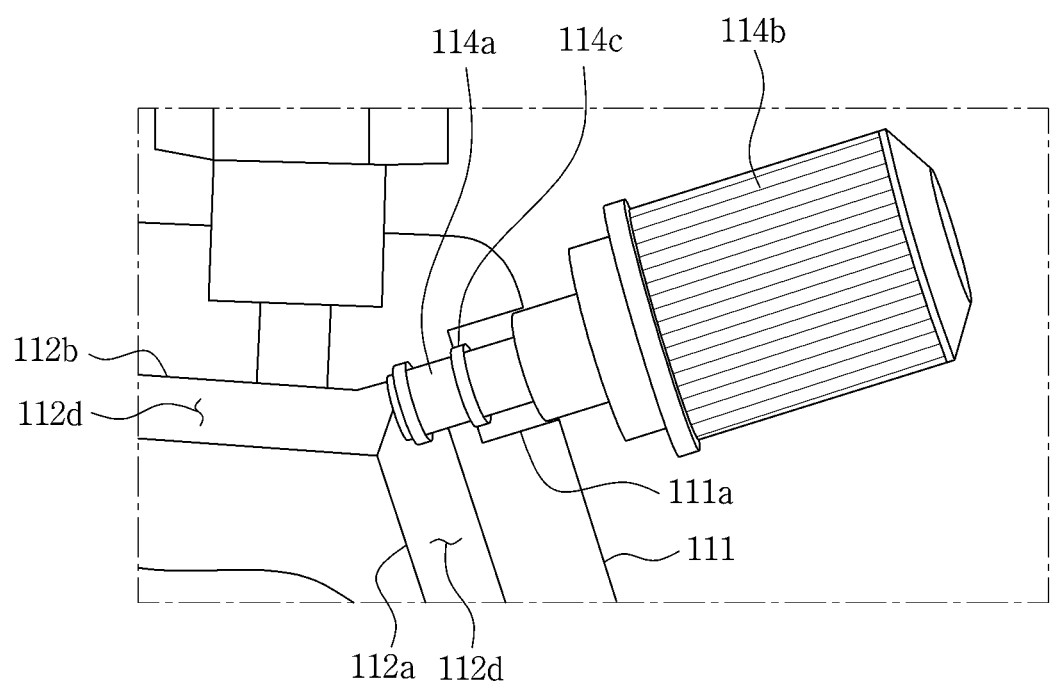
FIGS. 4A and 4B are views illustrating a structure of an adjusting member according to an exemplary embodiment of the present disclosure.
Figure 4B:
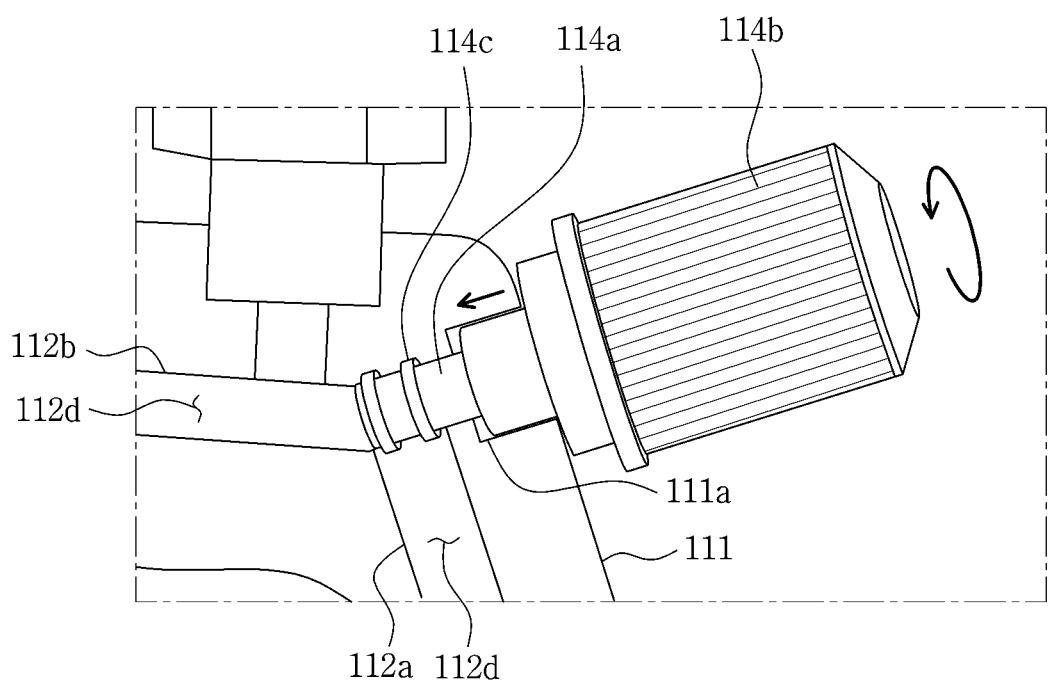

FIGS. 4A and 4B are a view illustrating a structure of an adjusting member according to an exemplary embodiment of the present disclosure. The structure of the adjusting member 114 will be described in detail with reference to FIGS. 1 to 4B.

The adjusting member 114 controls a degree of opening a flow passage of the first part 112a of the flow passage 112d of the gas pipe 112. The adjusting member 114 is rotatably installed in the groove 111a of the frame 111 and at least a part thereof may protrude to the flow passage 112d formed in the first part 112a of the gas pipe 112. That is, a degree of opening of the flow passage 112d of gas pipe 112 may be adjusted by adjusting a length of the adjusting member 114 inserted into the gas pipe 112. The adjusting member 114 includes an insertion body 114a and an adjustment body 114b.

The insertion body 114a may be a portion which is inserted into the gas pipe 112. The insertion body 114a is provided with a cylindrical shape and a diameter thereof is formed to be equal to or smaller than the inner diameter of the gas pipe 112. The insertion body 114a may include a sealing body 114c on the outer circumferential surface. The sealing body 114c may shield the gap between the insertion body 114a and the gas pipe 112. That is, the insertion body 114a is in more effectively close contact with the gas pipe 112 by means of the sealing body 114 to more effectively adjust the degree of opening of the flow passage 112d. With this structure, the insertion body 114a may adjust a flow rate of the gas which moves through the flow passage 112d.

The adjustment body 114b is fixed to the insertion body 114a and is rotatably coupled to the groove 111a of the frame 111. For example, the adjustment body 114b may be screwed to the groove 111a. An operator rotates the adjustment body 114b to adjust a depth of the insertion body 114a which is inserted into the gas pipe 112. The degree of opening of the flow passage 112d may be adjusted by the rotation of the adjusting member 114 and the operator may close the flow passage 112d using the adjustment body 114b and the insertion body 114a in an emergency situation. However, the structure and the shape of the adjusting member 114 are not limited thereto and may be provided with various structures to adjust an opening degree of the flow passage 112d.

Referring to FIG. 2, the valve 120 may open/close the flow passage 112d. Further, the valve 120 may adjust the degree of opening of the flow passage 112d. The valve 120 is installed in the gas pipe 112. For example, the valve 120 may be installed in a position of the second part 112b adjacent to the first part 112a or installed in a portion where the first part 112a and the second part 112b are in contact with each other. Further, the valve 120 may be automatically controlled by the control module 135 of the flow meter 130 to be described below or manually controlled by the operator. Hereinafter, an automatic mode in which the valve 120 is automatically controlled and a manual mode in which the valve 120 is manually controlled will be individually described.

The valve 120 adjusts a degree of opening of the flow passage 112d and fully opens or closes the flow passage 112d. The valve 120 is controlled by the control module 135 and adjusts the degree of opening of the flow passage 112d to open or close the flow passage 112d. For example, the valve 120 may be provided as a mass flow controller (MFC). The valve 120 may be modified in various ways within the range that adjusts the flow rate of the gas, as well as the MFC. For example, the valve 120 may be provided as a solenoid valve which is controlled by the control module 135.

The valve 120 is manually operated by the operator to adjust a degree of opening of the flow passage 112d. That is, the valve 120 may fully open or close the flow passage 112d by the judgement and manipulation of the operator. The valve 120 may further include a lever 121 which is pressurized by the manipulation of the operator and is rotatably installed in the body 110. The lever 121 may be rotatably coupled to the body 110 and may be connected to an end portion of the valve 120 in a lever structure. That is, when the lever 121 is pressurized by the operator, the lever 121 rotates around the portion coupled to the body 110 to transmit force to the valve 120. The valve 120 moves by the rotating operation of the lever 121 and adjusts the degree of opening of the flow passage 112d. Accordingly, the valve supplies the gas to the radiosonde instrument 20 by means of the gas injection apparatus 100 or stops supplying the gas.

The body 110 further includes a support member 115 to support the lever 121 to maintain a state of the lever 121 which is pulled by the operator. The support member 115 may include a fixture 115a and a support pin 115b.

The fixture 115a is installed in the frame 111 and is disposed toward the lever 121. For example, the fixture 115a may be installed in a downwardly bent portion of the frame 111.

The support pin 115b is rotatably coupled to the fixture 115a and the inside may be penetrated so that the lever 121 is inserted thereinto. For example, the support pin 115 may be formed to have a "U" shape. In the pulled state of the lever 121, the support pin 115b rotates and the pulled lever 121 is inserted thereinto. In a state in which the lever 121 is inserted into the support pin 115b, the lever 121 is supported by the support pin 115b and the pulled state is maintained.

Accordingly, even though the operator does not continuously pull the lever 121, the pulled state of the lever 121 may be maintained by the support member 115.

The flow meter 130 is installed on the body 110 and measures and displays a flow rate of the gas supplied to the radiosonde instrument 20. To this end, the flow meter 130 includes a reception module 131, a measurement module 132, a display module 133, a calculation module 134, and a control module 135. Further, as described above, when the valve 120 operates in a manual mode by the operator (that is, operates by the lever 121), the flow meter 130 may further include an alarm module 136 to notify the operator of a gas amount.

The reception module 131 is connected to the tank flow sensor 12. The reception module 131 may receive a gas amount (that is, a first measurement value) stored in the storage tank 10 from the tank flow sensor 12. For example, the reception module 131 receives the gas amount (the first measurement value) stored in the storage tank 10 at every predetermined time or receives the gas amount (the first measurement value) stored in the storage tank 10 in real-time. Hereinafter, an example that the reception module 131 receives the gas amount (that is, a first measurement value) stored in the storage tank 10 from the tank flow sensor 12 in real-time will be described.

The measurement module 132 is connected to the reception module 131 and measures a gas amount (a second measurement value) flowing along the flow passage 112d based on the gas amount (the first measurement value) transmitted from the reception module 131. That is, the measurement module 132 continuously receives the first measurement value from the reception module 131 and compares the difference of the received first measurement values. That is, the measurement module 132 calculates a reduced amount of the received first measurement value to measure a gas amount (the second measurement value) flowing along the flow passage 112d. For example, the measurement module 132 calculates a reduced amount of the first measurement values using a fast Fourier transform (FFT) algorithm.

The measurement module 132 may include a flow rate measurement sensor which is connected to the gas pipe 112 to measure a flow rate of the gas which passes through the flow passage 112d. For example, the measurement module 132 may be provided as a mechanical flow meter which measures a flow rate using a turbine or a rotor or an electromagnetic flow meter which measures a flow rate using an electromotive force.

The display module 133 is connected to the reception module 131 and the measurement module 132 and displays the gas amount (the first measurement value) stored in the storage tank 10 and the gas amount (a second measurement value) flowing along the flow passage 112d. The display module 133 is installed in an upper portion of the body 110 and is provided as a configuration which visualizes the first measurement value and the second measurement value. For example, the display module 133 may be a display and visually displays the first measurement value and the second measurement value.

Further, the display module 133 may further include an input member 133a which inputs a predetermined gas amount to display the predetermined gas amount to be supplied to the radiosonde instrument 20. That is, the operator inputs the predetermined gas amount by means of the input member 133a and the display module 133 displays the predetermined gas amount.

The calculation module 134 is connected to the display module 133 and the measurement module 132 and calculates a remaining gas amount (a third measurement value) to be supplied to the radiosonde instrument 20 based on the gas amount (the second measurement value) measured by the measurement module 132 and the predetermined gas amount. For example, the calculation module 134 receives the second measurement value from the measurement module 132 in real time and receives the predetermined gas amount from the display module 133 to calculate a difference between the predetermined gas amount and the second measurement value to calculate a remaining gas amount (the third measurement value) to be supplied to the radiosonde instrument 20. For example, the calculation module 134 calculates the third measurement values using the fast Fourier transform (FFT) algorithm.

In the meantime, the display module 133 may display a third measurement value calculated by the calculation module 134.

The control module 135 is connected to the measurement module 132 and the display module 133 and compares the gas amount (the second measurement value) measured by the measurement module 132 and the predetermined gas amount to be supplied to the radiosonde instrument 20 to control the valve 120 to be open/closed. The control module 135 operates the valve 120 when the second measurement value exceeds 90% of a predetermined gas amount. When the gas amount (second measurement value) measured by the measurement module 132 exceeds 90% of a predetermined gas amount, the control module 135 controls the valve 120 to reduce the degree of opening of the flow passage 112d in proportion to the exceeded gas amount. Therefore, the valve 120 is controlled by the control module 135 and the supply of the gas to the radiosonde instrument 20 may be controlled in the automatic mode.

When the operator controls the valve 120 using the lever 121 (that is, the valve 120 is controlled in a manual mode), if the gas amount injected into the radiosonde instrument 20 exceeds 90% of a predetermined gas amount, the alarm module 136 performs the notifying function to the operator. The alarm module 136 is connected to the measurement module 132 and the display module 133 and receives the second measurement value and the predetermined gas amount in an electromagnetic manner. Further, the alarm module 136 operates in a visual manner or an auditory manner and gives a notification to the operator. However, the condition for allowing the alarm module 136 to the notifying function (that is, the gas amount injected into the radiosonde instrument 20 exceeds 90% of a predetermined gas amount) is not limited thereto so that the alarm function may be performed according to an exceeding condition which is set in advance by the operator.

Figure 5:
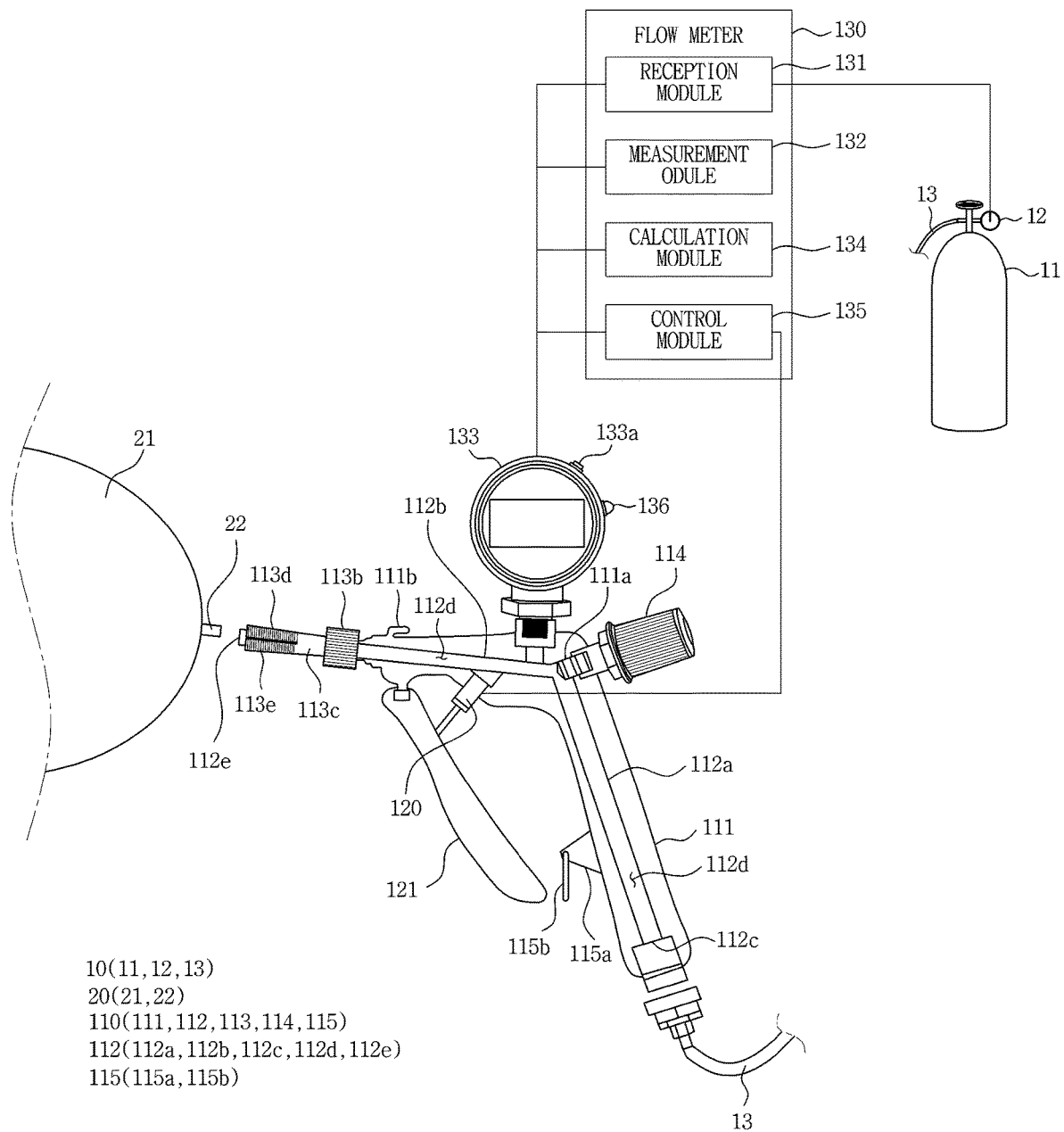
FIG. 5 is a view illustrating a state before injecting gas using a gas injection apparatus according to an exemplary embodiment of the present disclosure.
Figure 6:
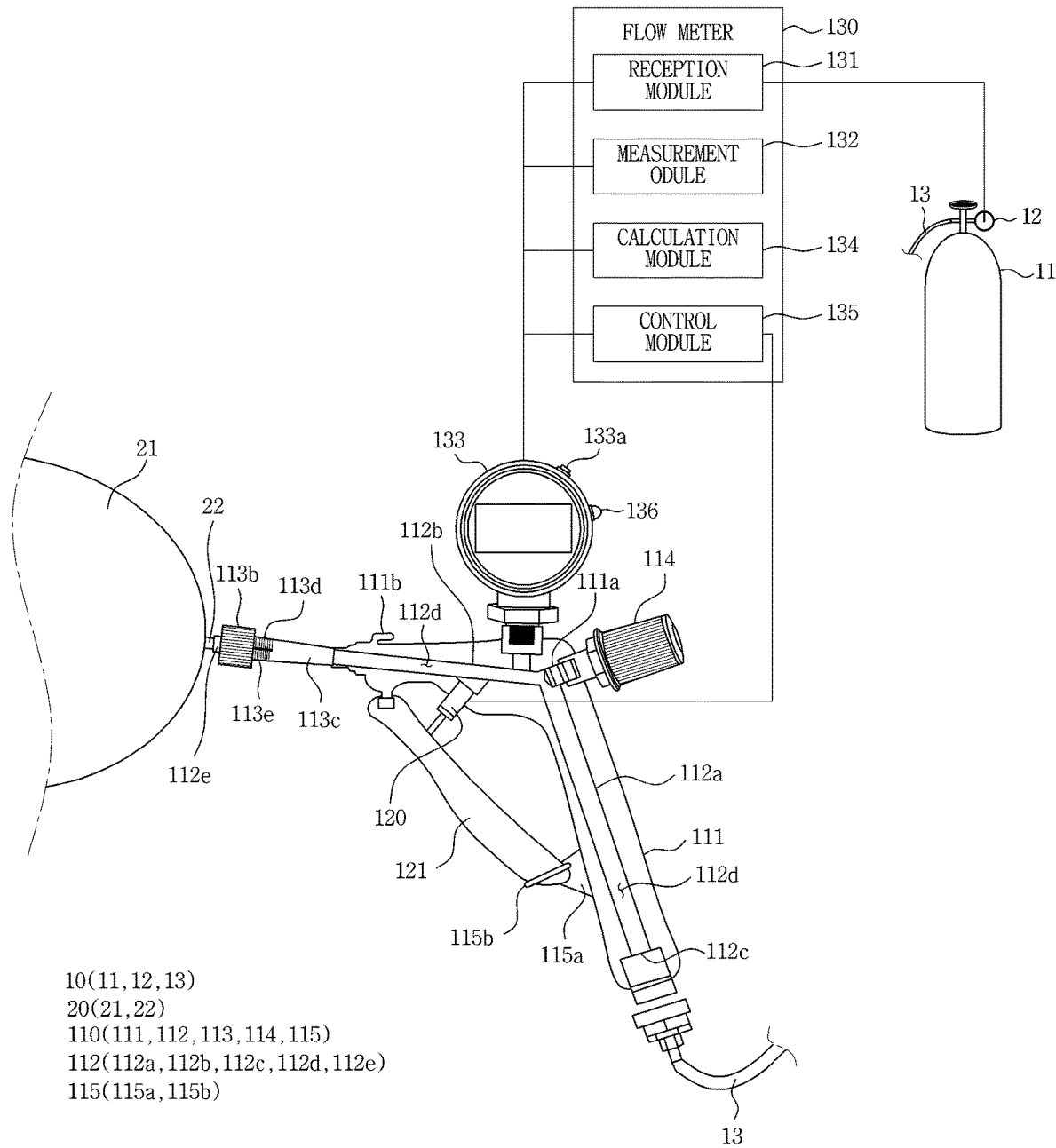
FIG. 6 is a view illustrating a state of injecting gas using a gas injection apparatus according to an exemplary embodiment of the present disclosure.

FIG. 5 is a view illustrating a state before injecting gas using a gas injection apparatus according to an exemplary embodiment of the present disclosure; and FIG. 6 is a view illustrating a state of injecting gas using a gas injection apparatus according to an exemplary embodiment of the present disclosure.

A process of supplying gas from the storage tank 10 to the radiosonde instrument 20 using the gas injection apparatus 100 will be described with reference to FIGS. 5 and 6.

Referring to FIG. 5, the radiosonde instrument 20 to which the gas is injected may be prepared. A radiosonde (not illustrated) for observing weather in a high-rise area may be coupled to the radiosonde instrument 20. Further, the supply hose 13 of the storage tank 10 may not be connected to the gas injection apparatus 100.

The flow passage 112d of the gas injection apparatus 100 may be closed by the valve 120. The fixing nut 113b of the fixing member 113 may be disposed in the first fixing unit 113c. The display module 133 of the flow meter 130 may display a gas amount (first measurement value) stored in the storage tank 10. That is, the display module 133 displays the gas amount (the first measurement value) of the storage tank 10 transmitted from the tank flow sensor 12 to allow the operator to see the gas amount.

Referring to FIG. 6, the gas is injected into the radiosonde instrument 20 using the gas injection apparatus 100. To be more specific, the supply hose 13 of the storage tank 10 may be coupled to the inlet port 122c of the gas injection apparatus 100. Thereafter, the outlet port 112e of the gas injection apparatus 100 may be coupled to the inlet pipe 22 of the radiosonde Instrument 20.

The fixing member 113 may insert the inlet pipe 22 between the second fixing unit 113d and the third fixing unit 113e in a state in which the first fixing unit 113c of the fixing nipple 113a is coupled to the frame 111. Thereafter, when the fixing nut 113b moves toward the second fixing unit 113d and the third fixing unit 113e, the fixing nut 113b pressurizes the second fixing unit 113d and the third fixing unit 113e so that the second fixing unit 113d and the third fixing unit 113e pressurize the inlet pipe 22. That is, the second fixing unit 113d and the third fixing unit 113e fix the inlet pipe 22. The fixing nut 113b is screwed on the screw thread formed on the outer circumferential surfaces of the second fixing unit 113d and the third fixing unit 113e and is not pushed toward the first fixing unit 113c, and maintains a pressurizing state of the second fixing unit 113d and the third fixing unit 113e.

The predetermined gas amount to be supplied to the radiosonde instrument 20 may be input to the display module 133 by means of the input member 133a. The predetermined gas amount may vary depending on a flying speed and a flying time of the radiosonde.

Thereafter, the valve 120 operates to open the flow passage 112d. Here, the valve 120 may be automatically operated by the control module 135 or manually controlled by the operator (that is, the lever 121 is pulled by the operator to be controlled).

The gas stored in the storage tank 10 is supplied to the balloon 21 of the radiosonde instrument 20 by means of the supply hose 13, the gas pipe 112, and the inlet pipe 22 by the series of above-described processes. During the process of supplying the gas, the tank flow sensor 12 calculates the gas amount (first measurement value) of the tank housing 11 in real-time and transmits the calculated gas amount (first measurement value) to the reception module 131. The reception module 131 receives the gas amount (first measurement value) of the storage tank 10 from the tank flow sensor 12 in real-time to transmit the gas amount (first measurement value) to the measurement module 132.

The measurement module 132 calculates the difference between the received gas amounts (first measurement values) to measure a gas amount (second measurement value) to be supplied to the radiosonde instrument 20 from the storage tank 10. That is, the measurement module 132 calculates the gas amount (second measurement value) to be supplied to the radiosonde instrument 20 based on the reduced amount of the gas stored in the storage tank 10.

The display module 133 receives and displays the gas amount (the second measurement value) to be supplied to the radiosonde instrument 20 from the measurement module 132.

The calculation module 134 receives a predetermined gas amount to be supplied to the radiosonde instrument 20 from the display module 133 and receives the gas amount (second measurement value) to be supplied to the radiosonde instrument 20 from the measurement module 132. The calculation value 134 calculates the difference between the predetermined gas amount and the gas amount (second measurement value) to be supplied to the radiosonde instrument 20 to measure a remaining gas amount (third measurement value) to be supplied to the radiosonde instrument 20. The calculation module 134 transmits the remaining gas amount (third measurement value) to be supplied to the radiosonde instrument 20 to the display module 133 again and the display module 133 displays the remaining gas amount (third measurement value) to be supplied to the radiosonde instrument 20.

The control module 135 receives a predetermined gas amount to be supplied to the radiosonde instrument 20 from the display module 133 and receives the gas amount (second measurement value) to be supplied to the radiosonde instrument 20 from the measurement module 132. The control module 135 compares the gas amount (the second measurement value) calculated by the measurement module 132 and the predetermined gas amount to be supplied to the radiosonde instrument 20 to control the valve 120 to be open/closed. For example, when the gas amount (the second measurement value) measured by the measurement module 132 exceeds 90% of a predetermined gas amount, the control module 135 controls the valve 120 to reduce the degree of opening of the flow passage 112d in proportion to the exceeded gas amount. Therefore, the valve 120 automatically operates by the control module 135 to close the flow passage 112d.

The valve 120 may be manually controlled by the operator. That is, when the alarm module 136 notifies that the gas amount injected into the radiosonde instrument 20 exceeds 90% of the predetermined gas amount, the operator releases the pressurized state of the pulled lever 121 to return the lever 121 to its original position. Therefore, the valve 120 closes the flow passage 112d.

According to the present disclosure, when the gas is injected into the radiosonde instrument, an amount of gas injected into the instrument may be identified in real-time. Therefore, an amount of gas injected into the radiosonde instrument may be more precisely controlled. Further, the supply of the gas may be automatically controlled according to an amount of gas injected into the radiosonde instrument. Further, when the gas injected, separation of the radiosonde instrument from the gas injection apparatus due to the pressure of the injected gas may be suppressed or avoided.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A gas injection apparatus which injects gas stored in a storage tank into a radiosonde instrument, comprising:
    a body which includes an inlet port through which the gas is introduced from the storage tank, a flow passage through which the gas introduced from the inlet port flows, and an outlet port through which the gas passing through the flow passage is discharged;
    a valve configured to open and close the flow passage; and
    a flow meter which is installed in the body and is configured to measure the flow rate of the gas supplied to the radiosonde instrument and to display the measured flow rate,
    wherein the flow meter includes:
        a reception module which continuously receives a gas amount (first measurement value) of the storage tank; and
        a measurement module which is connected to the reception module and is configured to
            continuously receive the gas amount (first measurement value) of the storage tank from the reception module and
            measure a gas amount (second measurement value) flowing along the flow passage by calculating a reduced amount of the gas amount (first measurement value) of the storage tank.

2. The gas injection apparatus according to claim 1, wherein the flow meter further includes a display module which displays at least one of a gas amount (first measurement value) transmitted to the reception module and a gas amount (second measurement value) measured by the measurement module.

3. The gas injection apparatus according to claim 2, wherein the display module includes an input member to further display a predetermined gas amount to be supplied to the radiosonde instrument.

4. The gas injection apparatus according to claim 3,
    wherein the flow meter further includes a calculation module which is connected to the display module and the measurement module and calculates a remaining gas amount (third measurement value) to be supplied to the radiosonde instrument, based on the gas amount (second measurement value) measured by the measurement module and the predetermined gas amount, and
    wherein the display module further displays the remaining gas amount (third measurement value) to be supplied to the radiosonde instrument.

5. The gas injection apparatus according to claim 3, wherein the flow meter further includes a control module which compares a gas amount (second measurement value) measured by the measurement module and the predetermined gas amount to be supplied to the radiosonde instrument to control the valve to be open/closed.

6. The gas injection apparatus according to claim 5, wherein, when a gas amount (second measurement value) measured by the measurement module exceeds 90% of the predetermined gas amount, the control module reduces an opening degree of the valve in proportion to an exceeded gas amount.

7. The gas injection apparatus according to claim 5, wherein
    the valve includes a lever which is rotatably installed in the body and pressed by an operation of an operator to open/close the flow passage, and
    the flow meter further includes an alarm module which compares the second measurement value measured by the measurement module and the predetermined gas amount to be supplied to the radiosonde instrument and notifies the operator when the second measurement value measured by the measurement module exceeds 90% of the predetermined gas amount.

8. A gas injection apparatus which injects gas stored in a storage tank into a radiosonde instrument, comprising:
a body which includes an inlet port through which the gas is introduced from the storage tank, a flow passage through which the gas introduced from the inlet port flows, and an outlet port through which the gas passing through the flow passage is discharged;
a valve configured to open and close the flow passage; and
a flow meter which is installed in the body and is configured to measure the flow rate of the gas supplied to the radiosonde instrument and to display the measured flow rate,
wherein the body further includes:
a frame;
a gas pipe which partially protrudes from the frame, has the inlet port at one end, has the outlet port at the other end, and forms the flow passage; and
a fixing member which is disposed to enclose a portion of the gas pipe which protrudes from the frame, is selectively coupled to the radiosonde instrument, and is coupled to the frame.

9. The gas injection apparatus according to claim 8, wherein the fixing member includes:
a fixing nipple which is fixed to the frame at one end, is coupled to an inlet pipe of the radiosonde instrument at the other end, and has an inner diameter increasing from the one end to the other end; and
a fixing nut which is movably coupled to an outer circumferential surface of the fixing nipple so as to compress the other end of the fixing nipple.

10. The gas injection apparatus according to claim 9, wherein the fixing nipple includes:
a first fixing unit which forms the one end of the fixing nipple;
a second fixing unit which forms a portion of the other end of the fixing nipple and extends from the first fixing unit; and
a third fixing unit which forms another portion of the other end of the fixing nipple and extends from the first fixing unit so as to be opposite to the second fixing unit, and
wherein the fixing nut has an inner diameter that is larger than or equal to a diameter of the first fixing unit and that is smaller than or equal to a diameter formed by the second fixing unit and the third fixing unit.

11. The gas injection apparatus according to claim 8, wherein the body further includes an adjusting member which is inserted into the gas pipe and is rotatably coupled to the frame so as to adjust a flow rate of the gas in the flow passage.

12. A gas injection apparatus which injects gas of a storage tank into a radiosonde instrument, comprising:
a body which is connected to the storage tank and the instrument and has a flow passage through which gas is movable;
a valve which opens/closes the flow passage; and
a flow meter which is installed in the body and is configured to measure and display the flow rate of the gas supplied to the instrument,
wherein
the valve includes a lever which is pressurized by an operator and is rotatably installed in the body,
the flow meter includes a control module which is connected to the valve and operates according to the measured and displayed gas flow rate, and
the valve is configured to be operated by the lever to open or close the flow passage or operated by a control signal of the control module to open or close the flow passage.

* * * * *